United States Patent [19]

Reinders

[11] 4,025,269
[45] May 24, 1977

[54] MOLD STRUCTURE AND CAVITY FORMING INSERT ARRANGEMENT THEREFOR

[75] Inventor: Donald D. Reinders, Fort Wayne, Ind.

[73] Assignee: Acro Products, Inc., Fort Wayne, Ind.

[22] Filed: Feb. 9, 1976

[21] Appl. No.: 656,095

[52] U.S. Cl. .................. 425/249; 425/242 R; 425/247; 425/251
[51] Int. Cl.² .................................. B29F 1/022
[58] Field of Search ...... 425/247, 251, 252, 242 R, 425/451.9, 192 R, 249, DIG. 228, DIG. 30, DIG. 47

[56] References Cited

UNITED STATES PATENTS

| 3,360,829 | 1/1968 | Germ ................... 425/251 |
| 3,575,233 | 4/1971 | Mahle .................. 425/249 |
| 3,859,023 | 1/1975 | Pasch ................... 425/251 |
| 3,867,080 | 2/1975 | Bruder ................. 425/247 |

FOREIGN PATENTS OR APPLICATIONS

| 655,152 | 11/1964 | Belgium ............... 425/242 |
| 2,054,560 | 3/1969 | France ................ 425/451.9 |

*Primary Examiner*—Francis S. Husar
*Assistant Examiner*—William R. Briggs
*Attorney, Agent, or Firm*—Albert L. Jeffers; Roger M. Rickert

[57] ABSTRACT

A mold structure, especially a multi-cavity mold, and more particularly still, a mold structure in which rubber-like elements and the like can be molded with a minimum of flash. The mold structure is formed of multiple plates moveably connected together having mounted therein the cavity forming insert elements. The upper plate includes a chamber on top which receives the material to be molded and which material is transferred by a ram member from the chamber through suitable sprues in the insert elements in the top plate into the mold cavities which are to be filled. The mold cavities are formed by insert elements detachably mounted in the several plates making up the mold structure and include insert elements interposed between the chamber which receives the raw molding material and the cavities and which last mentioned insert elements are flexibly connected with the respective plate.

16 Claims, 12 Drawing Figures

U.S. Patent   May 24, 1977   Sheet 1 of 3   4,025,269
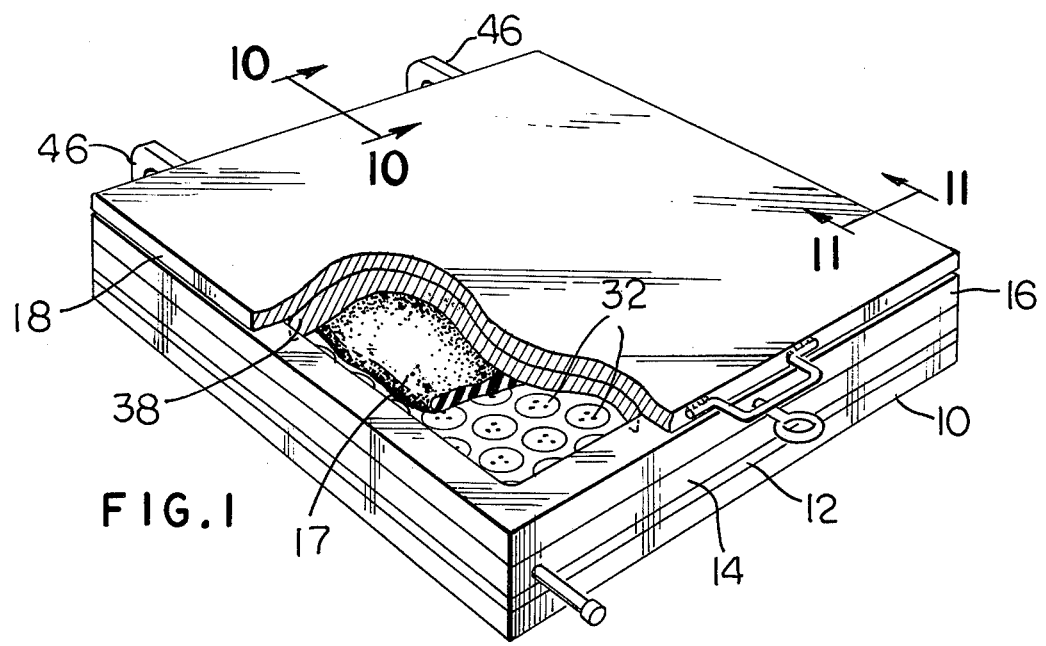
FIG. 1
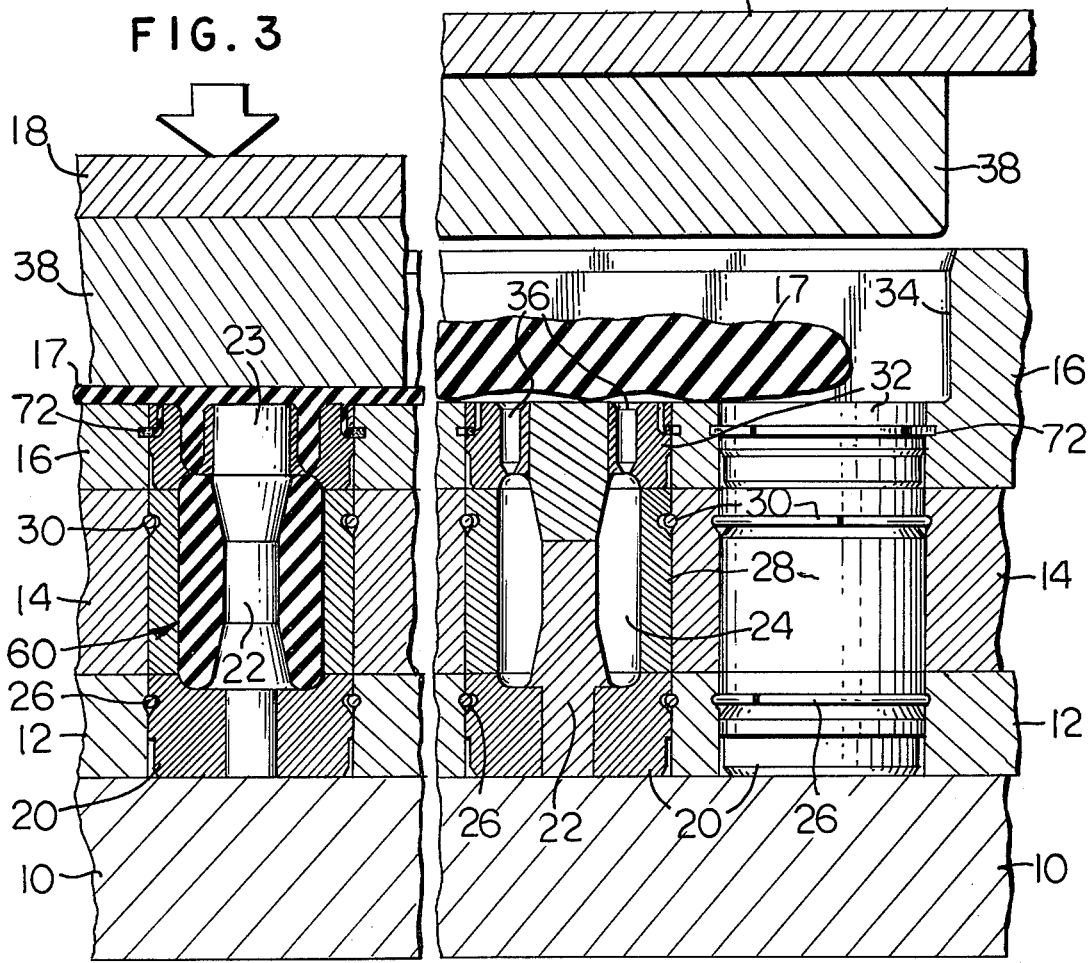
FIG. 2
FIG. 3

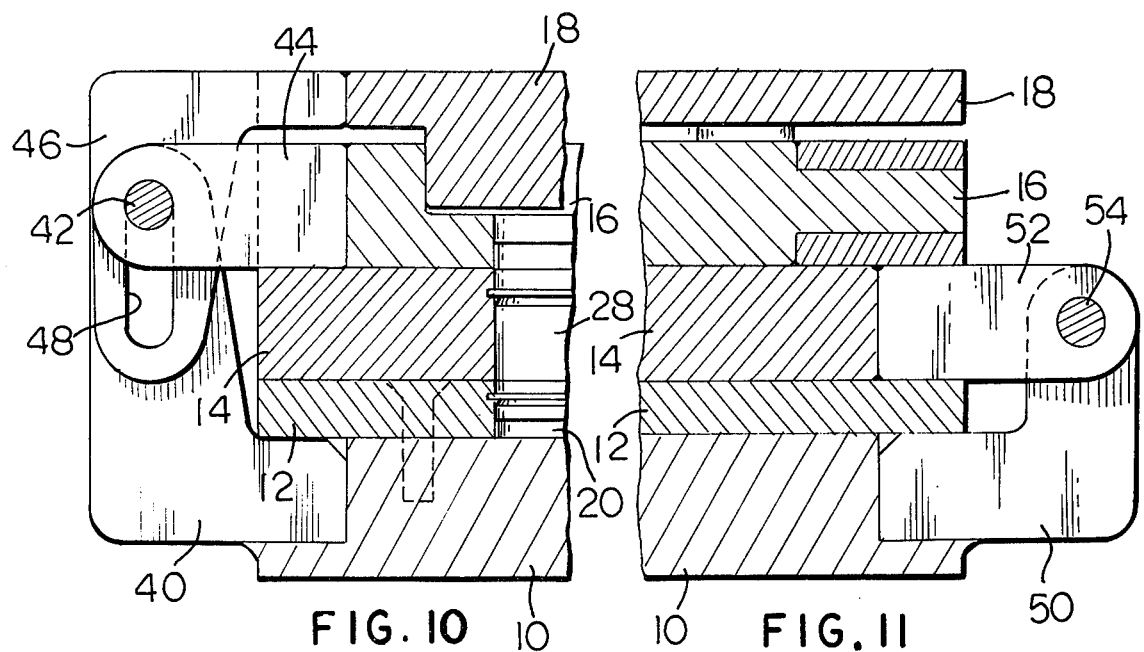
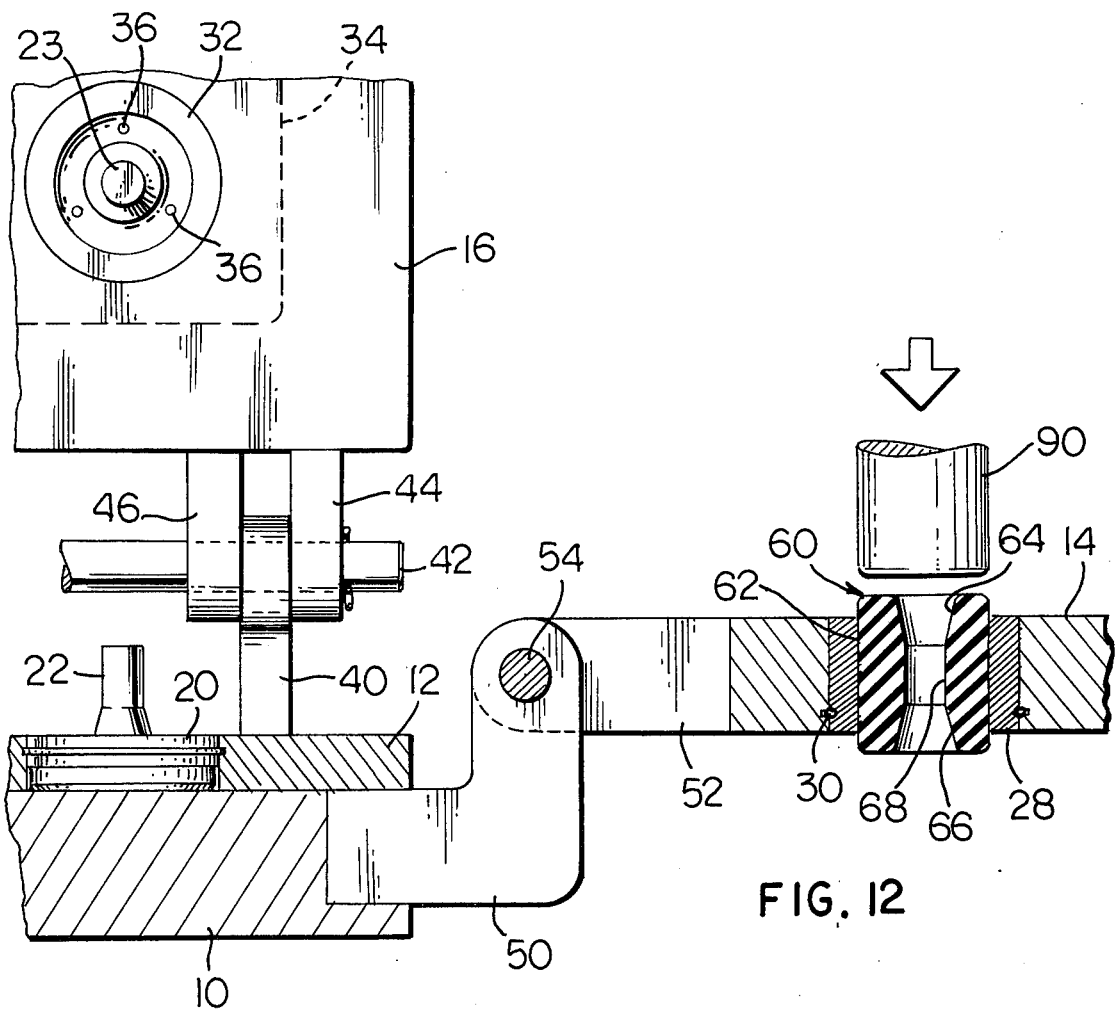

MOLD STRUCTURE AND CAVITY FORMING INSERT ARRANGEMENT THEREFOR

The present invention relates to a mold structure or arrangement, especially for molding rubber-like materials, and is particularly concerned with such a mold arrangement which is especially designed to reduce the amount of flash formed on the molded product.

Molded rubber-like members are used in great quantity in industry and it is, therefore, important that such members be produced rapidly and economically to dimensions as accurate as possible, and with the members requiring little or no finishing work after the molding operation.

Members of the nature referred to may, for example, consist of rubber-like bushings of the type which are employed for connecting the ends of a vehicle shock absorber to the parts of the vehicle. Other such resilient molded members are used in the mounting of electric motors and the like.

In any case, it will be evident that molded rubber-like members are used in great quantity in modern technology.

It will also be evident that the molding of such members with a minimum amount of flash, or the like which must be trimmed therefrom after molding, is a most desirable objective to achieve.

It will also be evident that it is most desirable for a mold structure in which such parts are to be molded be readily changeable from one type work member to another, or that the portions of the mold arrangement which define the cavities be readily replaceable should the parts become worn or damaged or the specific dimensions of the part being molded become changed for any reason.

BRIEF SUMMARY OF THE INVENTION

According to the present invention, a mold arrangement having the advantages referred to above is arrived at by mounting a plurality of plates in superposed relation and pivotally interconnecting the plates so that at least some thereof can be tilted upwardly to expose the interior of the mold arrangement.

More specifically, a mold arrangement according to the present invention comprises a main bottom plate, or base member, which forms the support for the mold arrangement when it is in use and a first plate resting thereon, referred to as a filler and core plate. The said first plate is adapted for supporting an end insert element forming the end part of a mold cavity and which insert element supports a core element which can project axially into the mold cavity.

Resting on the filler and core plate is a second or center cavity, plate which has therein a tubular insert element forming the main portion of the cavity in which a work member is to be molded.

Resting on top of the center cavity plate is a third, pot and top cavity, plate. This last mentioned plate has an insert element flexibly mounted therein which closes the upper end of each cavity of the mold structure, and also has an upwardly opening chamber extending over the range of all of the cavities of the mold structure.

Sprues formed in the insert elements in the pot and top cavity plate communicate the chamber with the mold cavities for the transfer of molding material into the cavities. The insert elements in the pot and top cavity plate also have cores which extend into the cavities and may engage the cores in the insert elements in the filler and core plate.

Finally, the mold arrangement comprises a ram plate which overlies the pot and top cavity plate and which has a piston or ram portion receivable in the chamber in the pot and top cavity plate so that, by pressing downwardly on the ram plate, raw molding material placed in the chamber will be forced through the sprues in the uppermost insert elements in the first, filler and core, plate; and second, center cavity, plate; and third, pot and top cavity, plate.

The base plate, or member, at the bottom of the mold arrangement and the filler and core plate are preferably secured together as by screws or the like, while the center cavity plate is pivotally connected with the base plate along one side edge thereof so that, when a molding operation has been completed, the center cavity plate can be swung into open position and work pieces formed therein can be ejected therefrom.

To permit the center cavity plate to pivot outwardly in the aforementioned manner, the pot and top cavity plate and the ram plate are also pivotally connected to the base plate of the whole arrangement along another edge thereof so that when these last mentioned plates are swung upwardly in one direction, the center cavity plate is exposed to swing upwardly and away from the filler and core plate and base plate in another direction.

The insert element at the upper end of each cavity which, as mentioned, is flexibly mounted in the pot and top cavity plate is connected thereto in a novel manner so as to have a certain degree of flexibility in the pot and top cavity plate, thereby eliminating the forming of flash on the molded articles. The flexibility of the insert elements in the pot and top cavity plate is maintained by the use of resilient seal elements surrounding each insert element so the elements do not sieze in the supporting plate but, rather, remain flexible therein and the several insert elements making up each cavity will always close tightly on one another and thereby substantially eliminate flash on products formed in the cavities.

The main cavity forming insert elements in the center cavity plate and the bottom cavity insert in the filler and core plate are advantageously releasably connected to the respective plates as by spring wire arrangements which permit ready removal of the insert elements from the respective plates, but which hold the insert elements in position during a molding operation and a subsequent work member ejecting operation.

The nature of the present invention will become more apparent upon reference to the following detailed specification taken in connection with the accompanying drawings in which:

FIG. 1 is a perspective view, partly broken away, showing a mold arrangement according to the present invention.

FIG. 2 is a vertical transverse section through a typical cavity of the mold arrangement of FIG. 1 and also shows in elevation a set of cavity forming inserts.

FIG. 3 is a view like FIG. 2, but shows the position of the mold after a cavity has been filled.

FIG. 10 is a sectional view indicated by line X—X on FIG. 1, showing a portion of the hinge arrangement which moveably interconnects parts of the mold structure.

FIG. 11 is a view indicated by line XI—XI of FIG. 1 and showing another hinge arrangement pertaining to the mold structure.

FIG. 12 is a fragmentary, somewhat schematic, view looking in from the front edge of the mold arrangement and showing the mold opened to expose work pieces for being ejected from the mold arrangement.

DETAILED DESCRIPTION OF THE INVENTION

Figures 4, 5, 6:
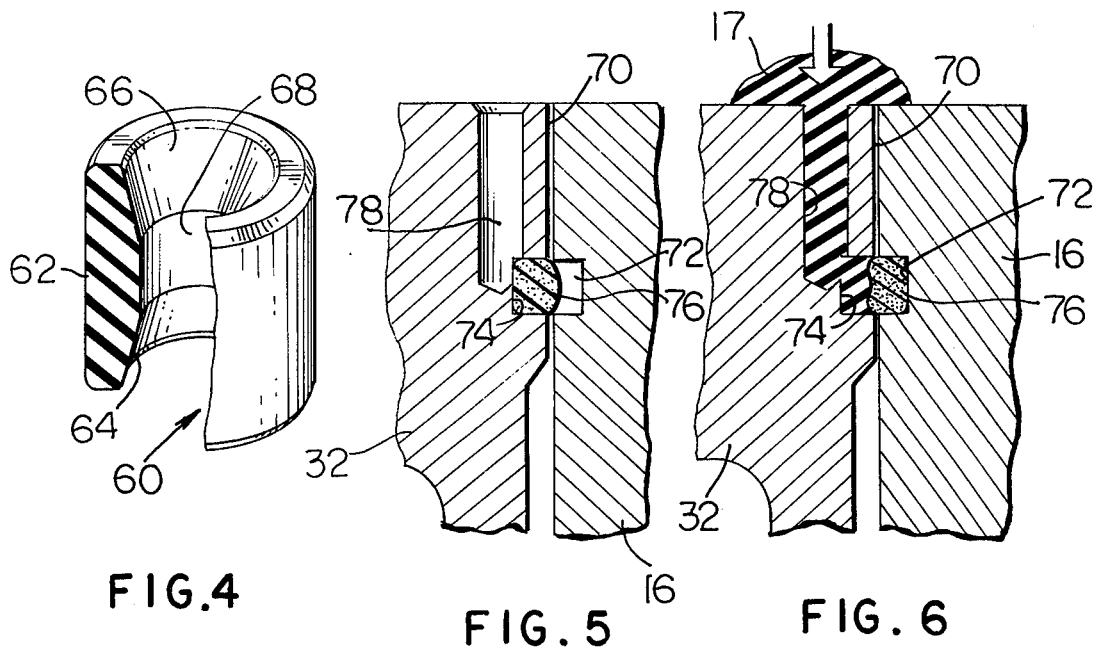
FIG. 4 is a perspective view, partly broken away, showing a typical work piece which could be molded in the mold arrangement of FIGS. 1 through 3.
FIG. 5 is a fragmentary view showing the mounting of an insert element in the pot and top cavity plate at the upper end of the mold cavity and prior to a molding operation.
FIG. 6 is a view like FIG. 5, but showing the insert element as it appears after a molding operation has been carried out.

Referring to the drawings somewhat more in detail, a mold arrangement, or structure, according to the present invention will be seen in perspective in FIG. 1, and wherein it will be seen that the mold arrangement includes a base member or plate 10 adapted to rest on a supporting surface. Resting on base member 10 is a first plate 12 which can be referred to as a filler and core plate. Resting on top of filler and core plate 12 is a second plate 14 which is a center cavity plate, and on top of plate 14 is a third plate 16, referred to as a pot and top cavity plate; while above top plate 16 is a ram plate 18.

As will be seen in FIG. 2, which is a vertical transverse section through a portion of the mold arrangement of FIG. 1, base plate 10 forms a supporting member for the mold arrangement, while filler and core plate 12 provides a support for lower cavity defining insert elements 20 to which may be affixed core elements 22 extending axially upwardly beyond the limits of filler and core plate 12.

At this point, it might be noted that a mold arrangement according to the present invention is adapted for use in forming a plurality of workpieces at one time so that the mold arrangement may define up to a 100 or more cavities which are to be filled with molding material.

FIG. 2 shows the elements making up one such cavity in vertical cross section to the left side of FIG. 2 while, to the right side of FIG. 2, the elements forming another of said cavities are illustrated in elevation.

The cavity itself is indicated at 24 in FIGS. 2 and 3 and it will be seen to be closed at the bottom by the insert element 20, which carries the core 22, and which insert is releasably retained in filler and core plate 12 by resilient spring wire means indicated at 26, to be described in more detail hereinafter.

The major portion of cavity 24 is formed by a further insert element 28 mounted in center cavity plate 14 and releasably held therein as by spring wire means 30 which are similar to, or identical with, the aformentioned spring wire means 26 pertaining to insert element 20.

The upper end of cavity 24 is closed by a further upper insert element 32 which may be referred to as a "modulating" insert element and which is held in the pot and top cavity plate 16 in a manner different than the insert elements 20 and 28 are supported in the respective plates. The particular manner in which modulating insert element 32 is supported in plate 16 will be described hereinafter in connection with FIGS. 5 and 6.

Plate 16 comprises an upwardly opening chamber 34 for receiving molding material, such as raw rubber, or rubber-like material, and chamber 34 communicates with each of the aforementioned cavities 24 via sprues 36 formed in the respective top insert elements 32. Each insert element 32 has a core element 23 thereon which engages core element 22 of the respective cavity to form an axial hole in the workpiece which is formed in the respective cavity.

It will be seen in FIG. 2 that chamber 34 is peripherally closed and is adapted to receive from the open upper side thereof a ram element 38 which depends from the underneath side of the aforementioned ram plate 18.

When the required amount of molding material is placed in chamber 34 and plate 18 is forced downwardly, the molding material will be displaced into the several cavities 24, as illustrated in FIG. 3. The simultaneous application of heat will cure the molding material when it is of the heat curable type.

As indicated in FIG. 3, the pressure exerted on ram plate 18 might be 2,000 poungs per square inch, while the temperature imparted to the molding material might range from 325° to 350°. The specific pressures and temperatures will be understood to be merely exemplary and to pertain, for example, to the molding and curing of a rubber-like composition.

For assisting in using the mold arrangement, the various plates making up the mold are interconnected as illustrated in sectional views 10 and 11.

In FIG. 10, it will be seen that base plate, or member, 10 has hinge elements 40 connected to the rearward edge thereof and extending upwardly therefrom and through which hinge elements there extends a hinge pin 42. The hinge pin 42 also extends through hinge elements 44 which are connected to the pot and top cavity plate 16. Plate 16 is, thus, tiltably upwardly toward the rear on base member 10.

The filler and core plate 12 is advantageously secured to base member 10 as by screws or the like, and is not tiltable thereon.

The ram plate 18 has hinge elements 46 thereon at the rear which comprise slots 48 engaging hinge pin 42 so that ram plate 18 is moveable vertically relative to the other plates of the mold arrangement a sufficient distance to displace the molding material placed in chamber 34 into the mold cavities.

The center cavity plate 14 is also hinged to base plate 10 as by hinge elements 50 on base plate 10 and 52 on center cavity plate 14, as shown in FIG. 11, and which hinge elements are pivotally interconnected by hinge pin means 54.

The described arrangement is such that ram plate 18 and pot and top cavity plate 16 can be tilted upwardly and toward the rear to expose center cavity plate 14 and, thereafter, center cavity plate 14 can be tilted upwardly and toward the side of the mold arrangement, thereby exposing the parts formed in cavities 24 at both the upper and lower ends, which will permit the parts to be dislodged from the central cavity insert elements 28.

The mold opened as described above, and with an ejector element 90 in the process of ejecting a workpiece from center cavity plate 15 is illustrated in FIG. 12.

FIG. 4 shows a workpiece 60 of the type which is formed in a cavity 24 such as is illustrated in FIGS. 2 and 3. The workpiece 60 is a rubber-like bushing having a substantially cylindrical outer wall 62 and a central bore with tapering end portions 64 at the bottom and 66 at the top, with the tapering end portions leading to a central cylindrical portion 68 of the bore. A bushing in the nature illustrated is employed for the mounting of shock absorbers in vehicles, for example.

The manner in which the modulating insert element 32 is supported in the pot and top cavity plate 16 is illustrated in FIGS. 5 and 6. In these views it will be noted that a small radial clearance 70 is provided between the insert element and the plate. This radial clearance may be relatively small, a few thousands of an inch, but is sufficient to permit some slight shifting of the insert element in plate 16, and also permits the insert element readily to be inserted in and removed from the plate.

Plate 16 and insert element 32 have opposed annular grooves 72, 74 formed therein which register when the insert element is in the proper axial position in plate 16. A Teflon ring 76 is mounted in groove 74 of the insert element and will be carried by the insert element when the insert element is inserted into the plate.

A drilled passage 78 leads from the radially inner side of groove 74 upwardly to the upward end of insert element 32 so as to be exposed to molding material within chamber 34. What occurs is that, once the insert element is put in place in plate 16, and a molding operation is carried out, molding material will be pressed downwardly through drilled passage 78 during a molding operation and press Teflon ring 76 radially outwardly into engagement with annular groove 72 of plate 16, thereby firmly locking and sealing the insert element in the proper position in the plate. The molding material in drilled passage 78 and in groove 74 will remain therein and become hardened until the insert element must be removed from plate 16 for whatever reason.

Once a molding operation is carried out, each insert element 32 will be fixedly held in place in plate 16 until it is again removed from the plate for purposes of repair or for changing the type of workpiece being made in the mold arrangement.

Figures 7, 8, 9:
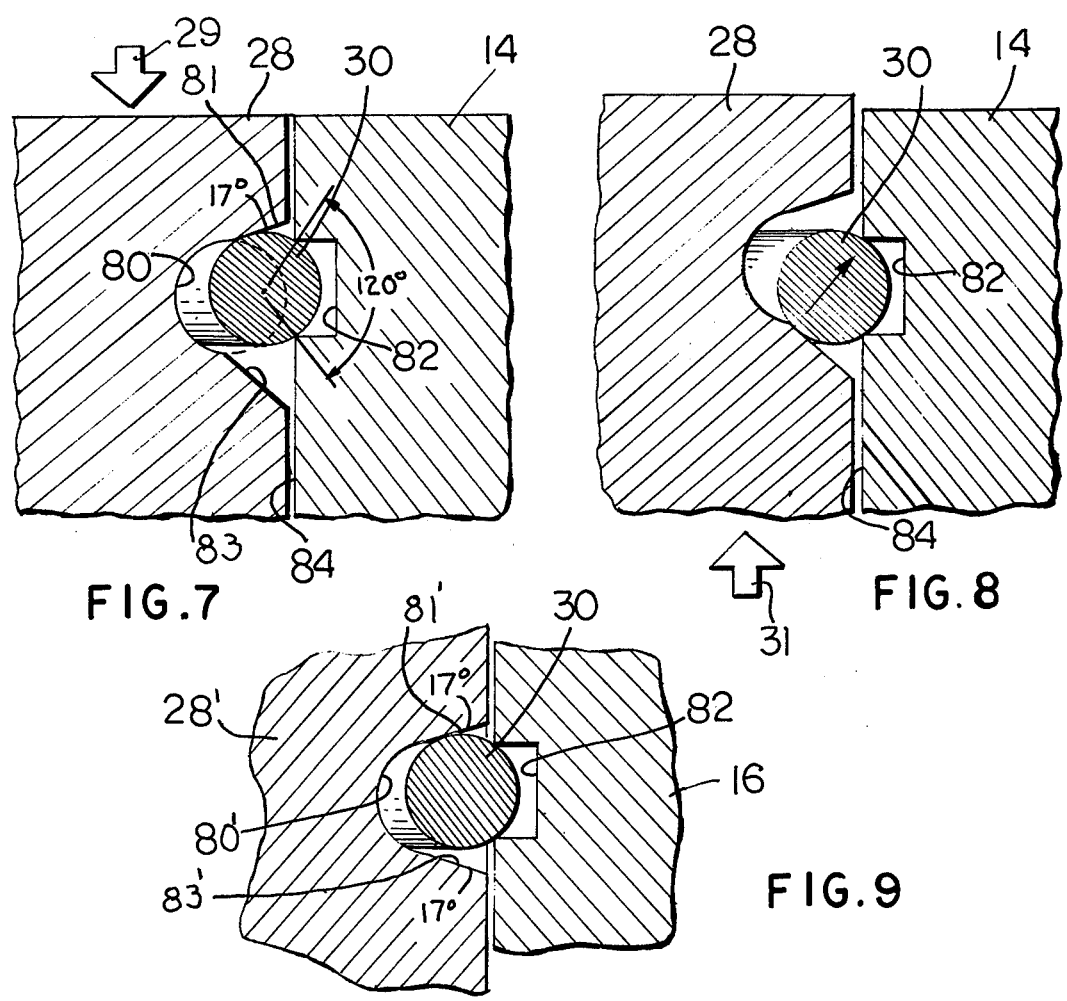
FIGS. 7, 8 and 9 are views showing the wire retainer arrangement for holding the insert elements in the center cavity plate and in the filler and core plate of the mold arrangement.

The manner in which insert elements 20 and 28 are held in the respective plates is illustrated in FIGS. 7 and 8 and the modification of this arrangement is shown in FIG. 9.

In FIGS. 8 and 9 an insert element 28 in plate 14 is illustrated. The wire 30 which holds the insert element in the plate is received in a groove 80 formed in the outer periphery of insert element 28 and it is also received in an annulur groove 82 formed in plate 14 about the periphery of the respective bore 84 in plate 14 that receives the respective insert element 28.

It will be noted that the downwardly facing upward side 81 of that portion of groove 80 which extends to the periphery of insert element 28 is inclined upwardly at an angle of about 17° as noted in FIG. 7. The corresponding portion 83 of groove 80 at the lower side of the groove and facing upwardly is, on the other hand, inclined downwardly at an angle of about 40° as shown in FIG. 7.

As will be seen in FIGS. 7 and 8, the points of engagement of wire 30 with the upper and lower edges of annular groove 82 in plate 14 are displaced from one another about 120°. Because of the location of the regions of engagement of the wire 30 with the edges of groove 82, pressure exerted in one direction on insert element 28, as indicated by arrow 29 on FIG. 7, will result in dislodging of the insert element from plate 14, whereas the exertion of pressure on the insert 28 in the opposite direction, as indicated by arrow 31 in FIG. 8, will not force the insert element from plate 14.

The arrangement illustrated in FIGS. 7 and 8 thus provides for selectively different dislodging forces to be exerted on the insert element 28 in opposite directions of movement thereof. It will be noted, for example, that the dislodging of work members from insert element 28 will not be accompanied by dislodging of the insert element from plate 14. An insert element 28 can readily be removed from plate 14, however, by exerting an upward force thereon when plate 14 is swung to its outer position.

As will be seen in FIG. 9, both flanks of the groove 81' and 83' in the insert element 28 illustrated therein can be disposed at 17° to the central plane of the groove and in this manner removal of insert element 28 from plate 14 in either direction is resisted by about the same force.

It will be apparent that the wires 30 illustrated in FIGS. 7, 8 and 9 are not in the form of simple snap rings but are preferably configured so that at least peripherally displaced portions of the wire engage groove 82, as illustrated in FIGS. 7 and 8. In this manner, the insert element 28 is located radially and axially in plate 14, but can, as described above, be dislodged therefrom by exerting an axial force in at least one direction thereof.

It will be appreciated that movement of plate 16 upwardly will withdraw core 23 from the center of the workpiece and, thereafter, when plate 14 is swung out to its FIG. 12 position, core 22 is withdrawn from the work member. The elongated cylindrical outer surface of the work member will hold the work member in insert element 28 until it is deliberately removed therefrom by actuation of the ejector element 90 pertaining to the respective work member and insert.

It will be apparent that a large variety of rubber-like bushings can be formed in a mold arrangement according to the present invention so that the advantages of the present invention can be realized in a plurality of different circumstances.

It will be understood that the different parts of the mold arrangement, that is to say, the several parts thereof, are adapted for being held in registration by suitable dowell pin arrangements and the like so that upon closing of the plates of the mold arrangement on each other all of the cavities are defined by properly registering insert elements, thereby eliminating flash and the like which would require work on the inserts subsequent to the molding thereof.

In presently known mold constructions having mold cavity forming inserts, rubber-like molding material can be forced between the inserts and the supporting plates and, eventually, prevent axial movement of respective inserts. As mold wear and distortion occur, the siezed inserts are held apart, thus leaving a space therebetween for receiving flash when a workpiece is made in the respective cavity. When this condition arises, it can be corrected in a conventional mold construction only by disassembling, cleaning, and reassembling the mold.

In the mold construction of the present invention, the Teflon seal and support ring for the uppermost cavity defining insert element, flexibly supports the respective insert while sealing against the flow of molding material to below the Teflon seal, thereby providing for continuous flexible support of the insert.

The wire supports for the other inserts for each cavity also remain coaxially free and flash control is, thus, insured. The coaxial freedom of the inserts provided by the wire supports within the limitations of each wire groove and the flexible support of the uppermost inserts are important for insuring that the inserts making up each cavity come together in firm, flash preventing, end to end, engagement when the mold is closed.

Modifications may be made within the scope of the appended claims.

What is claimed is:

1. A mold arrangement; a plurality of sets of first, second, and third insert elements in aligned end-to-end relation and each set of elements defining a mold cavity; first, second and third superposed plates supporting said first, second and third insert elements respectively; base means supporting said third plate, a chamber formed in said first plate; sprues in said first insert elements leading from said chamber into said mold cavities, a ram receivable in said chamber to displace molding material therefrom through said sprues into said mold cavities, first retaining means detachably holding said second and third insert elements in the respective plates, second retaining means holding said first elements in said first plate, said first retaining means including opposed grooves formed in each insert and the respective plate, wire elements engaged in said grooves, said wire elements being round in cross section, one of said grooves being shorter in the axial direction than the diameter of said wire, the other of said grooves being formed at the bottom to the same diameter as said wire and having the opposite sides diverging toward the open side of the groove.

2. A mold arrangement according to claim 1 which includes hinge means interconnecting said plates at the edges thereof for tilting movement of said first and second plates in respective directions on said third plate.

3. A mold arrangement according to claim 2 which includes ram plate means supporting said ram, and means connecting said ram plate means to said first plate for tilting movement thereon and also for linear movement relative thereto to move said ram into and out of said chamber.

4. A mold arrangement according to claim 1 in which at least one of said sides of said other groove is inclined at such an angle as to cause the wire to cam into said other groove and release said insert element from the plate when the insert element is pressed in one axial direction.

5. A mold arrangement according to claim 4 in which the other side of said other groove is inclined at such an angle as to cause the wire to prevent the insert element from being removed from the plate by pressing the insert element in the other axial direction.

6. A mold arrangement according to claim 1 in which said second retaining means comprises opposed grooves in said first insert element and first plate, a resilient ring in the groove in said insert element, and a passage leading from the radially inner side of said groove in the insert element to said chamber.

7. A mold arrangement according to claim 6 in which said first insert element has a small radial clearance in said first plate, and said resilient ring has a volume greater than that of the groove in said first plate.

8. A mold arrangement according to claim 7 in which said second insert element is tubular and said first and third insert elements close the ends thereof, and core means on at least one of said first and third insert elements and extending axially in said second insert element.

9. A mold arrangement according to claim 8 in which said core means comprises a core member on each of said first and third insert elements extending toward each other and abutting inside said second insert element.

10. A mold arrangement according to claim 8 in which the abutting ends of said core members are respectively convex and concave.

11. A mold arrangement according to claim 1 in which each wire element has at least one first circumferential portion engaging the bottom of said other grooe and at least one second circumferential portion engaging the mouth of said one groove to provide for flexible support of the pertaining insert in the respective plate.

12. In a mold arrangement having insert elements in end to end relation defining a mold cavity therein and superposed plates supporting the respective insert elements, a chamber in the plate supporting an end one of said insert elements and sprue means in the respective end insert element leading from the chamber to the respective cavity, said chamber adapted to receive molding material to be displaced therefrom via said sprue means into said cavity, registering opposed grooves in said end insert element and the supporting plate therefor, a resilient ring in said grooves, and passage means leading from the radially inner side of the groove in said end insert element to said chamber to receive molding material during a molding cycle to press said resilient ring radially outwardly and lock the ring in place in said grooves.

13. A mold arrangement according to claim 12 in which said ring forms a peripherally continuous seal between said end insert element and the supporting plate therefor.

14. A mold arrangement according to claim 12 in which said end insert element is flexibly supported in the supporting plate therefor after said resilient ring is locked in said grooves.

15. A mold arrangement according to claim 12 which includes means flexibly supporting the other insert elements making up the cavity in the respective plates.

16. A retaining and sealing means for mold comprising, in combination, a plate having an at least one opening therein, an insert adapted to be received in the opening of said plate, said insert having an annular groove spaced from the top of the insert, said insert having a passage communicating with the top of the insert and with the annular groove, said plate having a groove adapted to cooperate with the annular groove in the insert, a resilient ring mounted in the annular groove of the insert whereby molding material received during a molding operation will enter the passageway and annular groove to radially expand the resilient ring into a portion of the groove in the plate to flexibly lock and seal the insert with respect to the plate.

* * * * *

UNITED STATES PATENT AND TRADEMARK OFFICE
CERTIFICATE OF CORRECTION

PATENT NO. : 4,025,269
DATED : May 24, 1977
INVENTOR(S) : Donald D. Reinders

It is certified that error appears in the above-identified patent and that said Letters Patent are hereby corrected as shown below:

Col. 4, line 67, "15" should be -- 14 --.

Col. 8, line 20 (Claim 11) "grooe" should be -- groove --.

Signed and Sealed this second Day of August 1977

[SEAL]

Attest:

RUTH C. MASON
Attesting Officer

C. MARSHALL DANN
Commissioner of Patents and Trademarks